July 17, 1934.  F. M. SEELEY  1,966,972
LAWN MOWER
Filed May 18, 1931  2 Sheets-Sheet 1
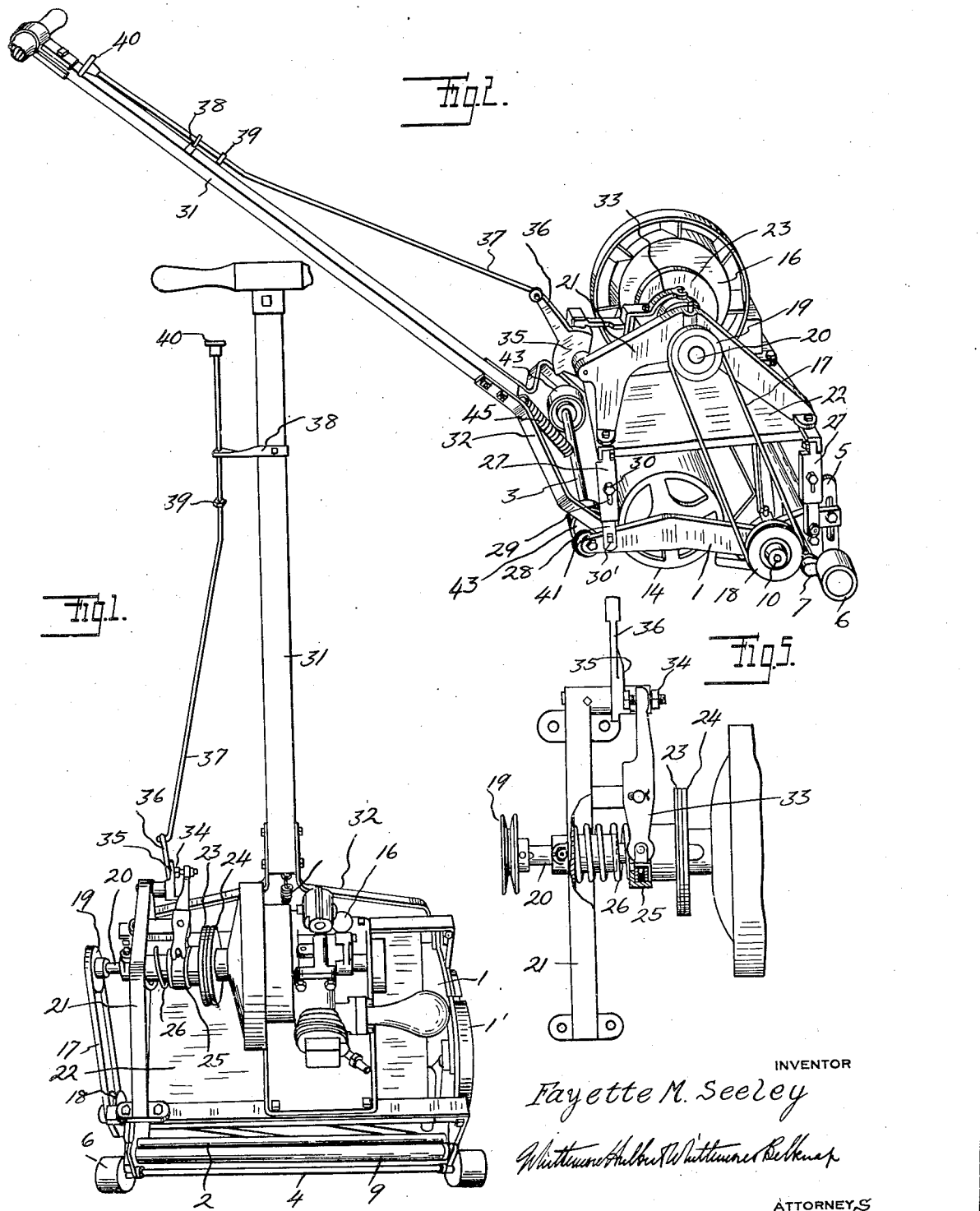
INVENTOR
Fayette M. Seeley
ATTORNEYS July 17, 1934.  F. M. SEELEY  1,966,972
LAWN MOWER
Filed May 18, 1931  2 Sheets-Sheet 2
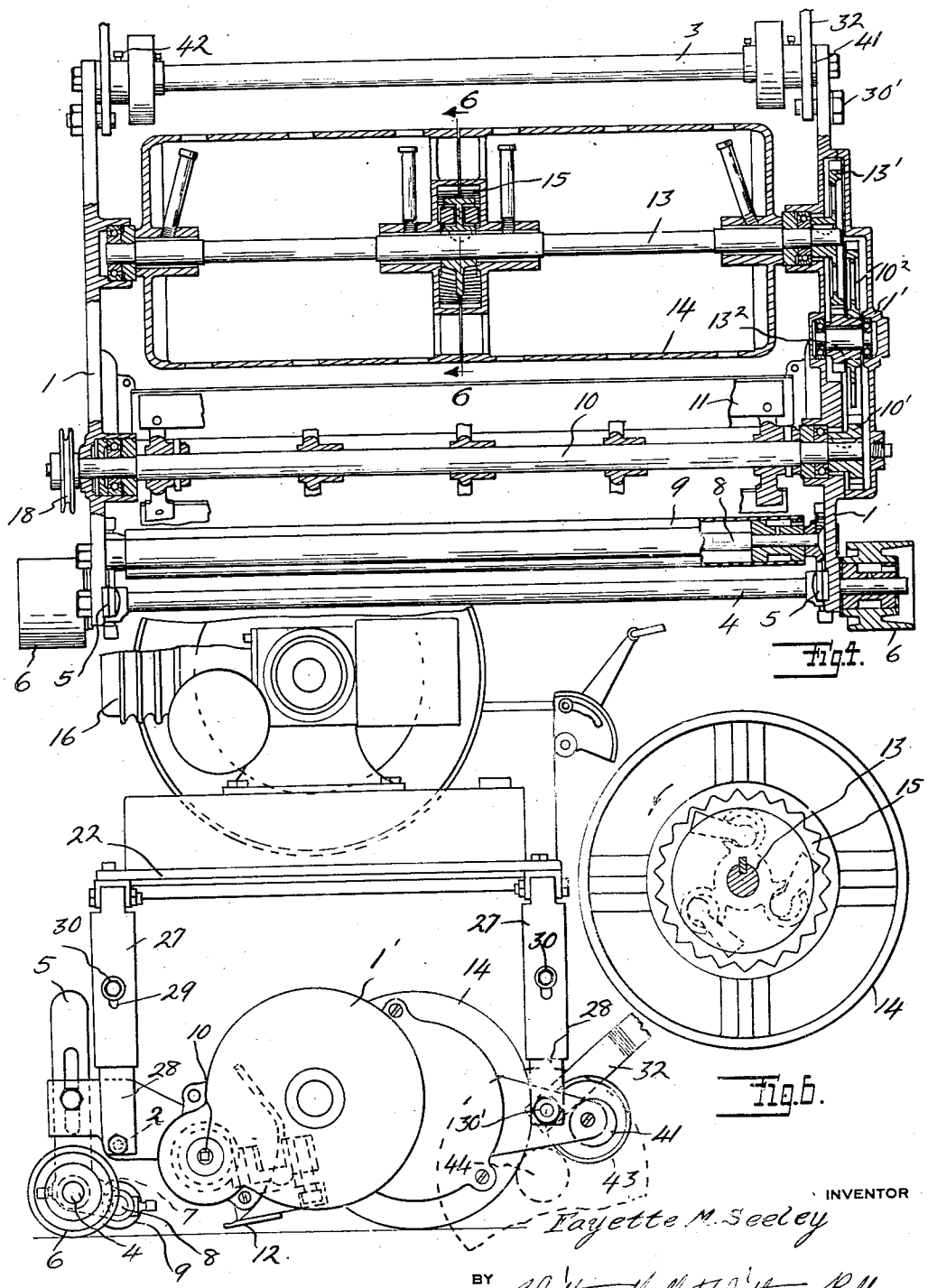
INVENTOR
Fayette M. Seeley Patented July 17, 1934

1,966,972

UNITED STATES PATENT OFFICE 1,966,972

LAWN MOWER

Fayette M. Seeley, Lansing, Mich., assignor to Ideal Power Lawn Mower Company, Lansing, Mich., a corporation of Michigan Application May 18, 1931, Serial No. 538,271

12 Claims. (Cl. 56—26)

The invention relates to lawn mowers and is particularly applicable to mowers for golf greens and fine bent lawns. The invention has for one of its objects the provision of an improved construction of power driven lawn mower. Other objects are to so construct the lawn mower that its motor is operatively connected to a rotatable member upon its frame upon movement of its handle in one direction only; to so construct the lawn mower that the movement of the handle in one direction is limited by adjustable means; to provide the lawn mower with two sets of ground engaging members which are so spaced that they form a pocket to receive a cross bar of a carriage for transporting the lawn mower; to provide a platform for the motor adjustably mounted upon the frame to maintain the endless driving member between the motor and rotatable member taut; and to provide means between the frame and the handle which automatically functions upon movement of the handle in a direction to make the operative connection between the motor and rotatable member to force the grass cutting reel toward the ground.

These and other objects of the invention will become apparent from the following description, taken in connection with the accompanying drawings, in which Figures 1 and 2 are perspective views of a lawn mower showing an embodiment of my invention;

Figure 3 is a side elevation thereof;

Figure 4 is a plan view of the construction shown in Figure 3 with certain parts broken away for the sake of clearness;

Figure 5 is a top plan view showing the clutch controlling device;

Figure 6 is a cross section on the line 6—6 of Figure 4.

The frame of the lawn mower comprises the side plates 1 and the front and rear cross bars 2 and 3, respectively. 4 is a shaft at the front end of the frame and extending through and secured to the lower ends of the arms 5, this shaft having journalled on its ends the ground engaging rollers 6. These arms 5 are vertically adjustably secured to the front ends of the side plates and have the rearwardly extending portions 7 in which is secured the shaft 8 upon which is journalled the roller 9 located between the side plates. 10 is a shaft journalled in the side plates 1 in rear of the roller 9 and having fixedly secured thereto the rotatable reel 11 which cooperates with the plate 12 extending between and fixed to the side plates to cut the grass. 13 is another shaft journalled in the side plates in rear of the shaft 10 and upon which is journalled the sectional ground engaging roller 14. This roller is formed in two sections which upon rotation of the shaft in the direction indicated by the arrow in Figure 6 are adapted to be driven therefrom in the same direction by the ratchet mechanism 15 connected to the shaft at its middle. This ratchet mechanism is such that the roller sections are driven from a shaft in the one direction only and independently of each other.

The shaft 13 is driven from the shaft 10 by means of suitable gearing mounted on one of the side plates 1. This gearing, as shown, comprises the pinion 10' secured upon the end of the shaft 10, the pinion 13' secured upon the end of the shaft 13 and the idler gears $10^2$ and $13^2$ secured together and respectively meshing with the pinion 10' and the pinion 13'. 1' is a covering for these pinions and gears secured to the side plate 1 and cooperating with the side plate to mount the shaft upon which the gears $10^2$ and $13^2$ are secured.

16 is a motor in the nature of an internal combustion engine which is carried upon the frame. This motor is adapted to drive the reel shaft 10 through the endless belt 17 which extends around the sheave 18 at one end of the reel shaft and the sheave 19 at the outer end of the shaft 20, which latter is journalled in the side plate 21. This side plate and the motor are mounted upon the platform 22 above the frame of the lawn mower. A suitable clutch is provided between the motor shaft and the shaft 20, and, as shown, this clutch is a friction clutch having driving and driven clutch members 23 and 24, respectively, the former being fixed to the motor shaft and the latter being fixed to the shaft 20. 25 is a collar connected to the driven clutch member and 26 is a coil spring between the side plate 21 and the collar and normally urging the clutch members into frictional engagement.

For tightening up the endless belt 17 to maintain the same taut, the platform 22 is adjustably mounted upon the frame of the lawn mower so that the platform can be raised relative to the frame. The adjustable supporting mechanism comprises four sets of telescoping bars with one set at each corner of the platform. Each set has the channel bar 27 secured to and depending from the platform 22 and the flat bar 28 secured to and extending upwardly from a side plate 1 and telescoping within the channel bar, the latter being provided with the longitudinally extending slot 29 for adjustably receiving the securing bolt 30 which extends through this slot and through a hole in the flat bar and is adapted to be fixedly secured in place by means of a clamping nut threaded upon the bolt. The arrangement is such that either or both of the front and rear ends of the platform may be raised.

31 is the handle having the bifurcated lower end 32. The lower ends of these bifurcations are pivotally mounted upon the bolts 30' at the rear ends of the side plates 1 and in advance of the rear cross bar 3. This handle controls the engagement of the driving and driven clutch members 23 and 24, respectively, through the following mechanism: 33 is a clutch yoke or bifurcated lever pivotally mounted upon the side plate 21 in rear of the shaft 20 and having its furcations connected to the collar 25. The rear end of this lever is provided with the set screw 34 extending transversely thereof and threaded therethrough and adapted to abut the cam 35 which is pivotally mounted upon the side plate 21 to swing through a vertical path. This cam is provided with the arm 36 to which is pivotally connected the lower end of the push rod 37. This push rod extends in the direction of the handle and through the bracket 38 upon the handle and is provided with the collar 39 adjustably threadedly engaging the rod and adapted to be engaged by the bracket upon upward swinging of the handle to swing the cam 35 forwardly from the position shown in Figure 2, thereby allowing the lever 33 to swing under the influence of the coil spring 26 and the driven clutch member to frictionally engage the driving clutch member. The outer end of the push rod is provided with the knob 40 adjacent the cross bar of the handle and adapted to be grasped to pull the push rod rearwardly and thereby swing the cam rearwardly and through this cam swing the lever and disconnect the driven clutch member from the driving clutch member. With this construction, it will be seen that if the clutch members are disengaged, their engaging action is controlled by upward swinging only of the handle. After their engagement the handle may swing downwardly without affecting the clutch engagement.

To assist in turning the lawn mower, the downward swinging of the handle 31 is limited so that a downward pressure upon this handle may raise the front ground engaging rollers 6 from the ground. To adjustably limit the downward swinging of the handle to best suit the operation of the lawn mower to operators of different heights, I have provided the eccentrics 41 upon the rear cross bar 3 and adjacent to the side plates 1 and engageable by the furcations 32 of the handle upon downward swinging of the latter. These eccentrics are rotatably adjustable relative to the cross bar and are suitably secured in their adjusted positions as by means of the set screws 42.

To hold the rear end of the lawn mower frame from coming into contact with the ground, there are the ground engaging rollers 43 journalled upon the rear cross bar 3 laterally inside the eccentrics. These rollers are so located and their diameters are such that they cooperate with the sectional ground engaging roller 14 to form a downwardly opening pocket for receiving the cross bar 44 of a carriage for transporting the lawn mower from one place to another. This carriage preferably has but two wheels and the cross bar is the shaft upon the ends of which the wheels are journalled.

For tilting the lawn mower forwardly and downwardly about its ground engaging roller 14 upon upward swinging of the handle 31 to force the reel 11 toward the ground, especially when engaging the clutch members, I have provided the coil spring 45 having one end connected to the rear cross bar 3 and the other end connected to the upper end of the handle furcations. It will be seen that with this arrangement the upward swinging of the handle progressively increases the tension of the coil spring, which causes the rear end of the lawn mower frame to swing upwardly about the ground engaging roller 14, thereby moving the reel 11 toward the ground or tending to force this reel toward the ground and maintain the front rollers 6 in contact with the ground.

What I claim as my invention is:

1. In a lawn mower, the combination with a frame, a rotatable ground engaging member upon said frame, a motor carried by said frame and operatively connected to the rotatable member and a handle movably connected to said frame, of means actuated by said handle upon movement thereof in one direction only for controlling the operative connection between said rotatable member and motor, said means being free of actuation by said handle upon movement thereof in the opposite direction.

2. In a lawn mower, the combination with a frame, a rotatable ground engaging member upon said frame and operatively connected to the ground engaging member, a motor carried by said frame and a handle movably connected to said frame, of means actuated by said handle upon movement thereof in one direction only for controlling the operative connection between said ground engaging member and motor to propel the lawn mower, said means being free of actuation by said handle upon movement thereof in the opposite direction.

3. In a lawn mower, the combination with a frame, a rotatable ground engaging member upon said frame, a motor carried by said frame, clutch members for operatively connecting said member and motor and a handle pivotally connected to said frame, of a rod actuated by said handle upon swinging thereof in one direction only for controlling the engagement of said clutch members, said rod being free of actuation by said handle upon swinging thereof in the opposite direction.

4. In a lawn mower, the combination with a frame, a rotatable ground engaging member upon said frame, a motor carried by said frame, clutch members for operatively connecting said ground engaging member and motor and a handle pivotally connected to said frame, of a cam upon said frame, a spring for normally engaging said clutch members with each other, a lever pivoted upon said frame and controlled by said cam for controlling the engagement of said clutch members, a push rod connected to said cam and cooperating means upon said push-rod and handle engageable upon swinging of said handle in an upward direction only for rotating said cam and thereby allowing said spring to bring said clutch members into engagement with each other.

5. In a lawn mower, the combination with a frame, a rotatable ground engaging member upon said frame, a motor carried by said frame and a handle pivotally connected to the rear of said frame, of means actuated by said handle upon movement thereof in one direction only for controlling the operative connection between said ground engaging member and motor, and means yieldably connecting portions of said frame and handle in rear of the pivotal connection between said frame and handle to tilt said frame forwardly about said ground engaging member upon upward swinging of said handle.

6. In a lawn mower, the combination with a frame, a rotatable reel upon said frame, a rotatable ground engaging member upon said frame in rear of said reel, a motor carried by said frame, clutch members upon said frame for operatively connecting said reel and ground engaging member to said motor and a handle pivotally connected to said frame in rear of said ground engaging member, of means actuated by said handle upon upward swinging thereof for controlling the engagement of said clutch members to propel the lawn mower, and spring means connecting portions of said frame and handle in rear of the pivotal connection between said frame and handle for resiliently tilting said frame forwardly about said ground engaging member upon upward swinging of said handle.

7. In a lawn mower, the combination with a frame having a cross bar, a rotatable ground engaging member upon said frame and a handle pivotally connected to said frame, of angularly adjustable eccentric means upon said cross bar engageable with said handle to limit swinging thereof in one direction.

8. In a lawn mower, the combination with a frame having a cross bar at its rear end, a rotatable ground engaging member upon said frame in advance of said cross bar and a handle pivotally connected to said frame in advance of said cross bar, of angularly adjustable eccentric means upon said cross bar engageable with said handle to limit downward swinging thereof, and ground engaging means upon said cross bar for holding said frame from engaging the ground upon downward swinging of said handle.

9. A lawn mower having in combination, a frame, a guiding handle movably connected to the frame, a rotatable ground engaging member upon said frame, a driving member for actuating the member aforesaid, a clutch interposed in the driving connection between the two aforesaid members and comprising relatively movable clutch elements, and means operable in dependence upon movement of the guiding handle in one direction only for relatively moving said clutch elements.

10. A lawn mower having in combination, a frame, a handle movably connected to the frame, a rotatable ground engaging member upon said frame, a driving member for actuating the ground engaging member, a clutch arranged within the operative connection between the aforesaid members and comprising cooperating relatively movable clutch elements, and means operable in dependence upon movement of the handle in one direction for relatively moving the clutch elements into engagement to propel the lawn mower, said means being inoperative to effect said clutch elements upon movement of the handle in any other direction than the one specified above.

11. A lawn mower having in combination, a frame, a guiding handle pivotally connected to the frame for movement upwardly and downwardly relative to the latter, a rotatable ground engaging member upon said frame, a driving member connected to the ground engaging member for rotating the latter, and an operative connection between the aforesaid members including means actuated by movement of the handle upwardly for establishing said connection to propel the lawn mower, said means being free of actuation upon downward movement of the handle.

12. In a lawn mower, the combination with a frame, a rotatable ground engaging member upon said frame, a motor carried by said frame and a handle pivotally connected to said frame, of means for operatively connecting the rotatable member and motor, means operable in dependence upon upward movement of the handle only to control the operative connection between the rotatable member and motor, and adjustable means upon said frame and engageable with said handle to limit downward swinging movement thereof.

FAYETTE M. SEELEY.